March 20, 1956 J. J. STONE, JR 2,739,237
AMPLIFIER CIRCUIT
Filed July 11, 1952
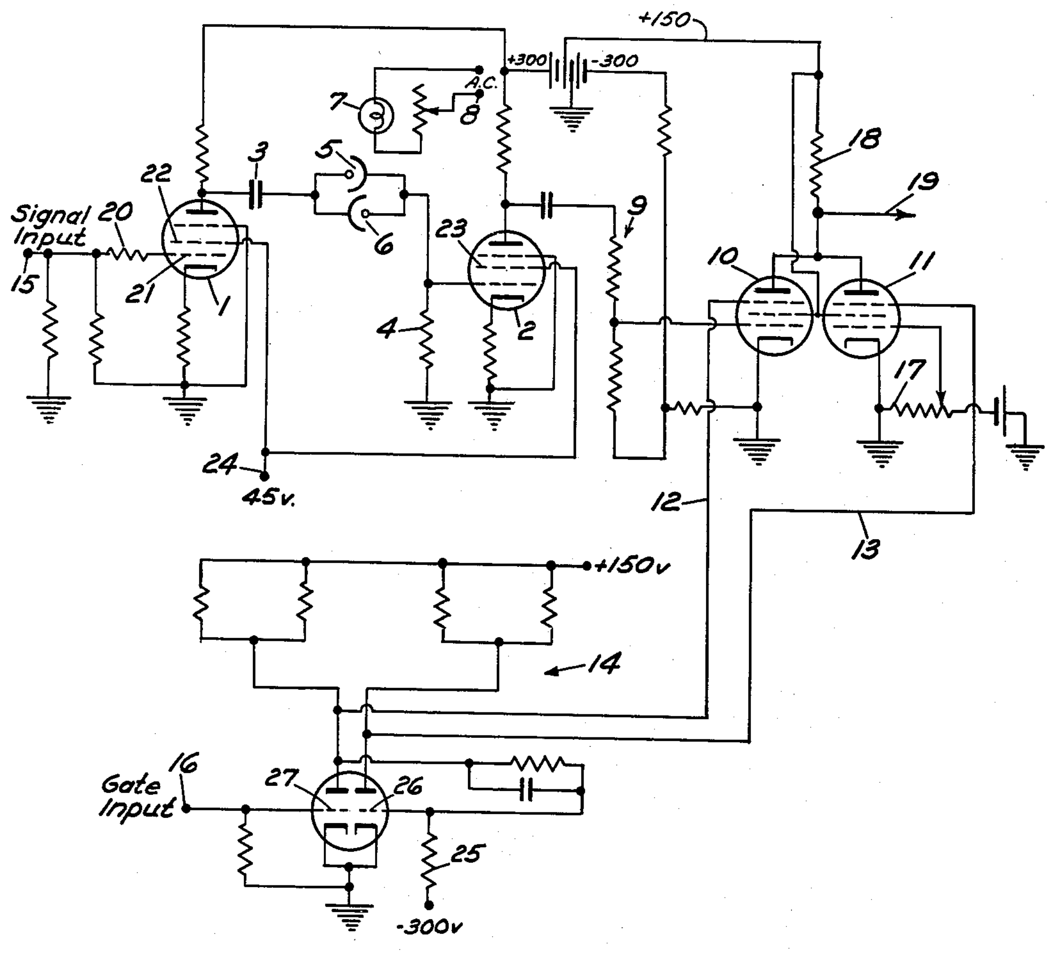
INVENTOR.
Joseph J. Stone, Jr.
BY
Roland A. Anderson
ATTORNEY United States Patent Office 2,739,237

Patented Mar. 20, 1956

2,739,237

AMPLIFIER CIRCUIT

Joseph J. Stone, Jr., Clinton, Tenn., assignor to the United States of America as represented by the United States Atomic Energy Commission Application July 11, 1952, Serial No. 298,419

4 Claims. (Cl. 250—27)

The present invention relates to electronic amplifying circuits, and more particularly to a gated amplifier adapted to receive input pulses of greatly different magnitudes, to reject those signals during gating intervals without producing spurious output pulses, to recover rapidly to an operative state for receiving successive pulses, and to deliver output pulses of a substantially constant magnitude.

In many applications, an amplifier must be designed to receive input pulses of greatly different magnitudes and to convert them to output pulses of a predetermined, substantially constant amplitude to operate some following network. Moreover, it may be desirable to discriminate between pulses received from a first source during selected time intervals, and pulses occurring between those intervals, originating from a second source. For example, the computer described in co-pending application Ser. No. 277,816 utilizes single magnetic recording heads for both reading and recording of information on magnetic tape. The amplifiers connected to those heads receive signals of 30 millivolts while reading, and 100 volts during recording. It is essential that no output pulse should be delivered to the following computer circuits during the recording interval, but it is also imperative that the amplifier be sensitive to input pulses substantially 1 millisecond thereafter.

To select certain pulses and reject others, I have devised a system for operating on the pulses to convert them to substantially the same amplitude, and for blocking the amplifier output during certain selected intervals without adding spurious pulses to the incident pulse train or losing desired pulses due to slow recovery of the blocked network. Circuit techniques of the prior art did not prove satisfactory. For example, if a conventional R–C coupled amplifier is made sufficiently sensitive to the small amplitude signals, then the large amplitude pulses, which could be 100 microseconds wide, for example, would completely block the system for longer than the maximum dead time allowable, because of the finite time required for the coupling capacitor to charge and discharge as the plate voltage of the first amplifier tube rises and falls. A direct coupled amplifier would not block, but might drift excessively. Both conventional amplifier types produce an output signal of a magnitude proportional to the input signal. However, it is necessary that the present circuit produce pulses of substatnially the same magnitude for both the largest and smallest input signals, in order that the gating may be simply and effectively accomplished. Moreover, the circuit must receive sinusoidal signals going both positive and negative, instead of only signals of a single polarity.

With a knowledge of the shortcomings of prior art circuit designs, I have as a primary object of my invention provision of an electrical circuit capable of receiving input pulses of greatly different amplitudes, delivering output pulses of a predetermined magnitude corresponding to certain of said pulses, and rejecting certain other of said pulses.

A further object of my invention is to provide means for converting positive and/or negative-going input signals of widely different amplitudes into signals of a predetermined amplitude for operating a connected network or device.

Other objects and advantages of my invention will be apparent from the following detailed description of a preferred embodiment thereof, when read in conjunction with the appended drawing.

In the figure, two pentodes 1, 2, are coupled by the capacitor 3, resistor 4, and a pair of vacuum phototubes 5, 6 connected back to back. The tubes are both subjected to light from a substantially constant intensity source such as bulb 7, energized from a voltage source 8. The vacuum type phototubes have a virtually flat anode current-anode voltage characteristic for a given light intensity. The signal at the plate of tube 2 may be connected through a differentiating network 9 to two interconnected pentode gate tubes 10, 11, controlled by gating input lines 12, 13, from cathode-coupled pair 14.

In operation, if a large positive pulse of 300 volts from a first source of signals be impressed on input 15, the voltage across tube 1 will drop from just below 300 volts to about 50 volts, and capacitor 3 will begin to discharge. But no more electrons may flow away through conducting phototube 5 than the saturation current of about 5 milliamperes, so the drop across resistor 4, which furnishes the input signal to tube 2, is limited to about 5 volts. At the end of the input pulse, tube 1 is driven below cutoff, the voltage across the tube will rise rapidly to 300 volts, and condenser 3 will charge up through phototube 6 and resistor 4, but again the charging current is limited by the saturation current of the phototube.

If a 30 millivolt sine wave from a second source of signals be applied to input 15, the plate voltage of tube 1 will vary only about 4 volts. Yet, because of their flat current-voltage characteristics, the phototubes will still conduct substantially 4 milliamperes for the 4 volt difference of potential, causing a drop across resistor 4 of about 4 volts, which is substantially the same as the signal produced by the 250 volt change in voltage across the coupling capacitor. Therefore, the signals at the plate of tube 2 will be very nearly of equal magnitude, irrespective of the size of the input signal impressed upon the circuit. The large pulses from the first source may be utilized to actuate pair 14 through input 16, driving line 12 to a low voltage level, cutting off tube 10, and thus blocking the pulse from the network 9. When the large pulses are not incident upon input 16, the positive potential applied to resistor 25 maintains tube 26 of the pair conducting, keeping tube 27 cut off, so that line 12 is at its high potential, unblocking gate tube 10. Then pulses from the network 9 will produce corresponding pulses at the output 19. Tube 10 is normally conducting, while tube 11 is normally cut off. The grid bias of the latter may be so adjusted by potentiometer 17 that when it does conduct, the average plate current that flows will equal that of tube 10. Since the average current through the common load resistor 18 does not change when tube 10 is cut off and tube 11 conducts, the average plate voltage at line 19 remains constant during the gating operation. Any voltage transient that does appear at output 19 is much smaller than the normal signal amplitude, and may easily be discriminated against.

The signals thus produced at output 19 will be, because of the differentiation in network 9, two pulses of opposite polarity, whether the input signal is one complete sinusoidal wave of 360 degrees or a large square wave incident on input 15.

It may be seen that resistor 20 clips the larger pulses by preventing excessive grid current from flowing during a large positive pulse. Those pulses are also clipped when grid 21 is driven below cutoff. The screen grids 22 and 23 are supplied from a common 45 volt supply 24, to improve recovery of the circuit after incidence of a large signal, rather than being connected through a dropping resistor to the 300 volt B+ source 25.

Since the saturation current that flows through phototubes 5 and 6 depends upon the intensity of the incident light, bulb 7 may be supplied from a source of variable voltage, if desired. For best operation, the saturation current may be adjusted by changing the voltage supplied to the bulb until the desired pulse signal is passed to tube 2 with but little attenuation. If the bulb is supplied from a fixed voltage source, the bulb may, of course, be moved physically into a position giving the desired phototube current.

Having described my invention, I claim:

1. A gated amplifier circuit for selectively amplifying pulses from different sources comprising first and second electron discharge devices each having a cathode, a control grid, and an anode, a capacitor coupled to the anode of said first device, a resistor connected between the cathode and control grid of said second device, a pair of vacuum phototubes connected in parallel and in opposing sense between said capacitor and said resistor, a source of light of substantially constant intensity arranged to illuminate said phototubes substantially equally, third and fourth electron discharge devices each having a cathode, first and second control grids, and an anode associated therewith, means for establishing a substantially constant potential at one control grid of said fourth device, means for coupling signals from said second device to a first control grid of said third device, a network connected to said second control grids of said third and fourth devices to block one of said devices but not the other upon receipt of a input pulse to said network, and means for deriving an output responsive to the current flow through each of said third and fourth devices.

2. An amplifier comprising first and second input circuits; a plurality of electric discharge devices, each including at least anode, cathode, and control grid electrodes, said first input being connected to said control grid of a first discharge device; a coupling network between said first and a second discharge device comprising a capacitor, a resistor, and a pair of vacuum phototubes disposed in parallel, opposed relationship between said resistor and capacitor; third and fourth interconnected discharge devices, said second input circuit being connected to the control grid of said third device and the anode of said third device being coupled to the control grid of said fourth device; fifth and sixth discharge devices provided with respective second control grids, said grids being coupled to said third and fourth discharge devices, respectively, whereby an input pulse at said second input renders inoperative one but not the other of said fifth and sixth discharge devices; a source of grid bias voltage connected to the first control grid of said sixth device; and means for coupling output pulses from said second discharge device to the first control grid of said fifth device.

3. An amplifier circuit comprising first and second electric discharge devices, each having at least cathode, anode, and control grid electrodes, a capacitor connected to the anode of said first device, a point of reference potential, a resistor connected between said point and the control grid of said second device, a pair of vacuum phototubes connected in parallel and in opposing sense between said capacitor and the junction point of said second device control grid with said resistor, and a source of light of substantially constant intensity disposed to illuminate said phototubes substantially equally.

4. In combination, first and second amplifying means, each having input and output circuits associated therewith and an interstage coupling circuit comprising a capacitor coupled by one terminal to the output circuit of said first means, a resistance connected across the input circuit of said second means to develop an input signal therefor, a pair of vacuum phototubes connected in parallel and in opposing sense interconnected between the other terminal of said capacitor and said resistance to limit the charging and discharging current of said capacitor, and a source of substantially constant illumination directed upon said phototubes.

References Cited in the file of this patent

UNITED STATES PATENTS

| | | |
|---|---|---|
| 1,737,830 | Grisson | Dec. 3, 1929 |
| 2,024,139 | Armstrong | Dec. 17, 1935 |
| 2,122,207 | Kellogg | June 28, 1938 |
| 2,176,663 | Browne et al. | Oct. 17, 1939 |
| 2,496,909 | Eberhard | Feb. 7, 1950 |
| 2,641,698 | Gloess et al. | June 9, 1953 |